United States Patent
Goslin et al.

(10) Patent No.: US 9,904,357 B2
(45) Date of Patent: Feb. 27, 2018

(54) LAUNCHING VIRTUAL OBJECTS USING A RAIL DEVICE

(71) Applicant: Disney Enterprises, Inc., Burbank, CA (US)

(72) Inventors: Michael P. Goslin, Sherman Oaks, CA (US); Jared Dal Porto Sain, Culver City, CA (US); John Henry Harris, III, Glendale, CA (US); Katherine M. Bassett, Pasadena, CA (US); Philippe Putzeys, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 10 days.

(21) Appl. No.: 14/966,104

(22) Filed: Dec. 11, 2015

(65) Prior Publication Data

US 2017/0168556 A1 Jun. 15, 2017

(51) Int. Cl.
*G06F 3/01* (2006.01)
*G06F 3/16* (2006.01)
(Continued)

(52) U.S. Cl.
CPC ............ *G06F 3/011* (2013.01); *A63F 13/245* (2014.09); *A63F 13/428* (2014.09); *G06F 3/014* (2013.01); *G06F 3/03548* (2013.01); *G06F 3/16* (2013.01); *A63F 13/211* (2014.09); *A63F 13/25* (2014.09); *A63F 13/40* (2014.09); *A63F 13/44* (2014.09);
(Continued)

(58) Field of Classification Search
CPC ........ G06F 3/011; G06F 3/16; G06F 3/03548; G06F 3/017; G06F 3/014; G06F 1/1694; G06F 1/163; A63F 13/52; A63F 13/25; A63F 13/02; A63F 13/10; A63F 13/44; A63F 13/40; A63F 13/245; A63F 13/06;
(Continued)

(56) References Cited

U.S. PATENT DOCUMENTS

| 6,347,972 B1* | 2/2002 | Gormley | A63B 67/08 446/138 |
| 2003/0032478 A1* | 2/2003 | Takahama | A63F 13/04 463/30 |

(Continued)

OTHER PUBLICATIONS

Spitz, Andrew et al. (Aug. 5, 2012). "Super Angry Birds—A Tangible Controller". Retrieved from soundplusdesign.com/?p=5428 and https://vimeo.com/46975682 on Mar. 21, 2017.*

*Primary Examiner* — Darlene M Ritchie
(74) *Attorney, Agent, or Firm* — Patterson + Sheridan, LLP (57) ABSTRACT

Embodiments herein describe a throwing apparatus that includes a projectile that slides on a rail. In one example, as the user makes a throwing action, the projectile slides along the rail and locks into place at an end of the rail. In response, the throwing apparatus launches a virtual object representing the projectile along a virtual path extending away from the throwing apparatus. The apparatus may include an emitter that transmits a signal indicative of the signal path of the virtual object. An external device receiving the signal can determine whether the device is on the path and whether it is struck by the virtual object. The apparatus may also include a speaker that outputs a sound simulating the projectile flying through free space. The speaker may change the volume of the sound depending on whether the virtual object is moving away or towards the throwing apparatus.

19 Claims, 5 Drawing Sheets (51) Int. Cl.
  *G06F 3/0346* (2013.01)
  *A63F 13/25* (2014.01)
  *A63F 13/52* (2014.01)
  *A63F 13/211* (2014.01)
  *A63F 13/44* (2014.01)
  *A63F 13/40* (2014.01)
  *A63F 13/428* (2014.01)
  *A63F 13/245* (2014.01)
  *G06F 3/0354* (2013.01)
  *G06F 1/16* (2006.01)

(52) U.S. Cl.
  CPC .............. *A63F 13/52* (2014.09); *G06F 1/163* (2013.01); *G06F 1/1694* (2013.01); *G06F 3/0346* (2013.01)

(58) Field of Classification Search
  CPC ...... A63F 13/12; A63F 13/005; A63F 13/211; A63F 13/428
  See application file for complete search history.

(56) References Cited

U.S. PATENT DOCUMENTS

| | | | | |
|---|---|---|---|---|
| 2004/0154461 A1* | 8/2004 | Havukainen | ......... | G10H 1/0066 84/645 |
| 2005/0023763 A1* | 2/2005 | Richardson | ........ | A63B 24/0003 273/348 |
| 2007/0066323 A1* | 3/2007 | Park | .......... | G01S 5/02 455/456.2 |
| 2009/0017799 A1* | 1/2009 | Thorn | ..................... | G06F 3/017 455/414.1 |
| 2009/0209346 A1* | 8/2009 | Cheng | ..................... | A63F 13/02 463/37 |
| 2011/0077065 A1* | 3/2011 | Sandoval | ............... | A63F 13/245 463/3 |
| 2011/0081923 A1* | 4/2011 | Forutanpour | ......... | G06F 1/1694 455/457 |
| 2011/0151955 A1* | 6/2011 | Nave | ..................... | A63F 13/655 463/2 |
| 2011/0273562 A1* | 11/2011 | Dawe | ................. | A63B 24/0021 348/139 |
| 2011/0316767 A1* | 12/2011 | Avrahami | ............... | G06F 1/1626 345/156 |
| 2012/0105438 A1* | 5/2012 | Huang | .................... | A63F 13/10 345/419 |
| 2012/0142416 A1* | 6/2012 | Joutras | ............... | G09B 19/0038 463/36 |
| 2012/0196684 A1* | 8/2012 | Richardson | ............. | A63F 13/44 463/42 |
| 2012/0249443 A1* | 10/2012 | Anderson | ............... | A63F 13/06 345/173 |
| 2012/0253487 A1* | 10/2012 | Dugan | .................. | A63F 13/428 700/91 |
| 2013/0116061 A1* | 5/2013 | Zhao | ..................... | A63B 15/00 473/221 |
| 2013/0130758 A1* | 5/2013 | Moore | .................... | A63F 13/12 463/2 |
| 2013/0218308 A1* | 8/2013 | Altshuler | ................ | G06F 19/00 700/91 |
| 2013/0303247 A1* | 11/2013 | Wu | ....................... | A63F 13/005 463/5 |
| 2015/0343287 A1* | 12/2015 | Stover | ................ | A63B 69/0002 473/458 |
| 2016/0054799 A1* | 2/2016 | Levesque | ................ | G06F 3/041 345/173 |
| 2016/0259404 A1* | 9/2016 | Woods | .................. | G06F 3/0346 |
| 2017/0180336 A1* | 6/2017 | Josephson | ............... | H04L 63/06 |

\* cited by examiner

LAUNCHING VIRTUAL OBJECTS USING A RAIL DEVICE

BACKGROUND

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system displays the user's avatar jumping. However, such interactions are typically limited to the virtual world, and any interactions outside the virtual world are limited (e.g., a hand-held gaming device could vibrate when certain actions occur).

SUMMARY

One embodiment described herein is a method that includes detecting a throwing action causing a physical projectile to move along a rail on an apparatus. In response to determining the physical projectile reaches a predefined position on the rail, the method includes emitting a signal from the apparatus indicating a virtual path in free space of a virtual object launched by the throwing action, wherein the virtual object represents the physical projectile.

Another embodiment described herein is a apparatus includes a rail, a projectile moveably mounted onto the rail, and an emitter configured to, in response to a throwing action causing the projectile to move along the rail, transmit a signal to a first external device indicating a virtual path in free space of a virtual object launched by the throwing action, wherein the virtual object represents the projectile.

Another embodiment described herein is a apparatus includes a rail, a projectile moveably mounted onto the rail, and a speaker configured to, in response to a throwing action causing the projectile to move along the rail, output audio simulating a virtual object representing the physical object flying through free space in a direction away from the apparatus.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein describe a throwing apparatus that includes a projectile that slides on a rail. In one embodiment, the apparatus is attachable to an arm or hand of a user. In one example, as the user makes a throwing action, the projectile slides along the rail until the projectile locks into place at an end of the rail. In response, the throwing apparatus launches a virtual object representing the projectile along a virtual path extending away from the throwing apparatus. Stated differently, the throwing apparatus determines what path the projectile would take if the projectile continued in the direction it was thrown and launches the virtual object along that path. In this manner, the throwing apparatus simulates the projectile flying through free space using the virtual object while the projectile remains on the throwing apparatus.

In one embodiment, the throwing apparatus includes an output device (e.g., a speaker) that simulates the projectile traveling on the virtual path. For example, the speaker may output a sound that corresponds to the projectile flying through the air. As the virtual object moves along the path away from the user, the speaker may decrease the volume of the sound to indicate that the distance between the user and the virtual object is increasing. In one embodiment, the virtual object returns to the throwing apparatus—e.g., a boomerang effect or in response to ricocheting off a wall. As such, the output device increases the sound thereby indicating to the user that the virtual object is approaching the apparatus. When the sound indicates the virtual object has reached the apparatus, the user may then make a catching action which moves the projectile on the rail back to a starting location.

In one embodiment, the throwing apparatus is part of an immersive storytelling environment that includes one or more storytelling devices (also referred to as interactive devices) that are each capable of producing some auditory and/or visual effect, to create an immersive and interactive storytelling experience for a user. In one embodiment, the actions performed by the storytelling devices may vary depending on a user action. For example, in a simulated battle scenario, the throwing action and the resulting virtual path may dictate what target is struck by the virtual object. In one embodiment, the throwing apparatus may include an emitter that transmits a light signal using a predefined radiation pattern simulating the virtual path of the projectile. Any storytelling device within the radiation pattern receives the light signal and determines it is the target of the projectile. In response, the storytelling device may cause a corresponding action figure to fall down or output a noise indicating the action figure was hit by the virtual object such as a clang or a grunt.

Figure 1A:
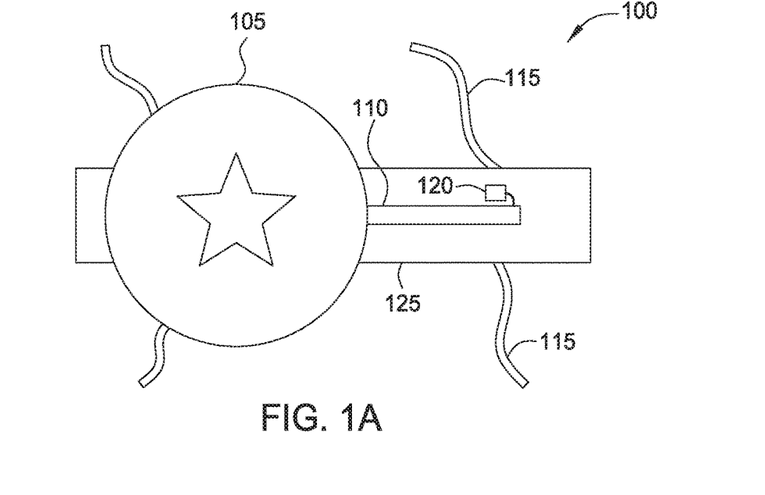
FIGS. 1A and 1B illustrate a throwing apparatus for moving a projectile along a guide rail, according to one embodiment described herein
Figure 1B:
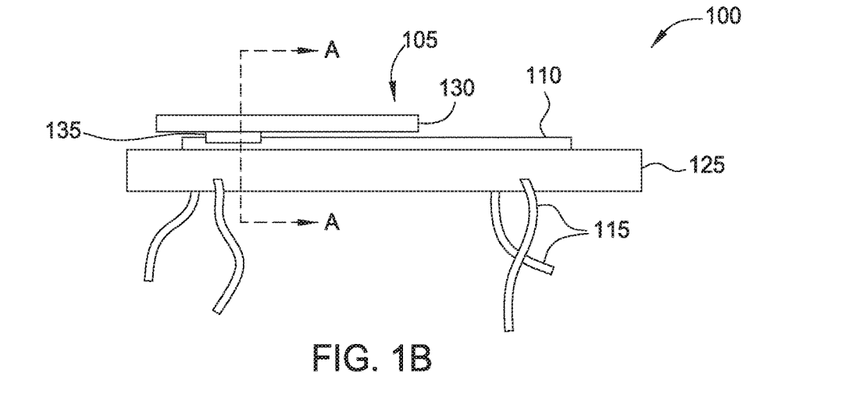

FIGS. 1A and 1B illustrate a throwing apparatus 100 for moving a projectile 105 along a guide rail 110, according to one embodiment described herein. Specifically, FIG. 1A illustrates a top view of the throwing apparatus 100. As shown, the throwing apparatus 100 includes a support member 135 on which the guide rail 110 is mounted. Moreover, the throwing apparatus 100 includes two pairs of fasteners 115 which may be used to secure the support member 135 onto the forearm of a user. However, instead of being attached to arm of the user, the throwing apparatus 100 can be held by the user, or attached to the back of the user's hand.

In FIG. 1A, the projectile 105 is shown at a starting position along the rail 110. For example, a first end of the rail 110 may be the starting position while the second, opposite end of the rail 110 is the end position. In response to the forces applied to the projectile 105 by the user when performing a throwing action, the projectile 105 slides along the rail 110 from the starting position to the end position. In the embodiment shown, the throwing apparatus 100 includes a locking element 120 for holding the projectile at the end position on the rail 110. That is, once the user performs the throwing action and the projectile reaches the end position on the rail 110, the locking element 120 holds the projectile at a stationary location. As will be discussed later, the user can release the locking element to permit the projectile to return to the starting position on the rail 110.

As shown, the projectile 105 represents a shield which slides along the track 110. However, the shape of the projectile 105 may be selected to represent any object such as a boomerang, a baseball, javelin, arrow, and the like. In one embodiment, the throwing apparatus 100 is a toy device that permits the user to play the role of a superhero who uses the projectile 105 to attack virtual or physical targets (e.g., toys) or defend against attacks from the targets or other players in an immersive storytelling environment.

FIG. 1B illustrates a side view of the throwing apparatus 100. As shown, the projectile 105 includes an upper portion 105 and a sliding element 135 which interlocks with the rail 110. As described above, the upper portion 105 is shaped to represent a particular object—e.g., ball, shield, boomerang, etc. The sliding element 135 couples the upper portion to the rail 110 to enable the projectile 105 to slide from the starting position (e.g., the leftmost end of the rail 110) to the end position (e.g., the rightmost end of the rail 110), and vice versa.

Figure 2:
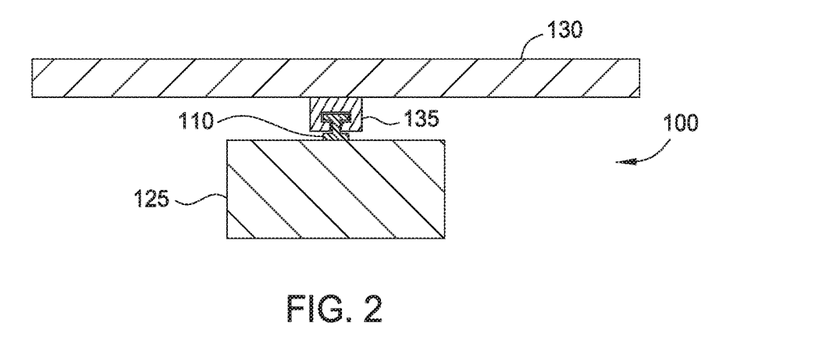
FIG. 2 is a cross-section of the throwing apparatus illustrated in FIG. 1B, according to one embodiment described herein.

FIG. 2 is a cross-section of the throwing apparatus 100 illustrated in FIG. 1B, according to one embodiment described herein. Specifically, the cross-section is taken along the dotted lines labeled A-A in FIG. 1B. The rail 110 is formed in the shape of an "I" which provides respective recesses into which the sliding portion 135 of the projectile 105 extends. Interlocking the sliding element 135 and the rail 110 keep the projectile 105 from coming off the rail 110 when the user performs a throwing action. For example, the rail 110 may include mechanical stops (e.g., locking mechanism 120) which prevent the sliding element 135 from moving past the respective ends of the rail 110.

However, the features shown in FIG. 2 are just one example of a design that can be used to interlock the sliding element 135 and the rail 110. In another embodiment, a portion of the sliding element 135 may be disposed within a cavity of the rail 110 which attaches the element 135 to the rail 110. In another example, the rail 110 may be raised above the support element 125 such that there is a gap between the rail 110 and the support member 125. The sliding element 135 may completely surround the rail 110 to guide the projectile 105 along the rail 110. The rail 110 may include supports at its respective ends (not shown) which attach the raised rail 110 to the support element 125. In yet another example, the rail 110 may be defined by a longitudinal recess in the support element 125 where the walls of the recess define the rail 110. The sliding element 135 may include a portion that extends into this recess and contacts the walls in order to move the projectile 105 along the rail 110.

FIG. 2 illustrates that the sliding element 135 slides along the rail 110 using smooth surfaces. As shown, the sliding element 135 includes surfaces in a facing relationship with one or more surfaces in the rail 110. Because these surfaces are smooth, the friction caused when these surfaces contact can be overcome by the forces applied by the user when making the throwing motion. However, in another embodiment, the sliding element 135 or the rail 110 may include rollers or bearings which further reduce friction between these components. For example, instead of the surfaces of the sliding element 135 and the rail 110 contacting, the sliding element 135 may include a plurality of ball bearings which contact the surfaces of the rail 110 and permit the projectile 105 to slide back and forth on the rail 110.

Figure 3:
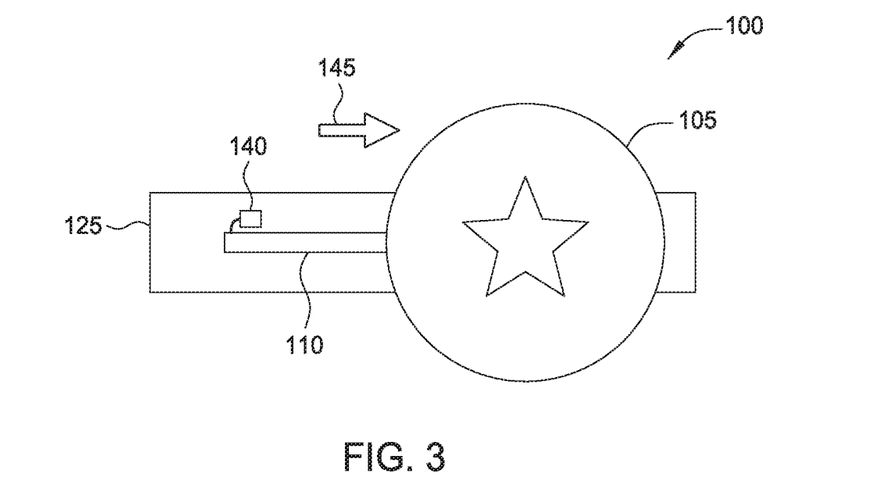
FIG. 3 illustrates a throwing action using the throwing apparatus, according to one embodiment described herein.

FIG. 3 illustrates a throwing action using the throwing apparatus 100, according to one embodiment described herein. As shown by arrow 145, the projectile 105 slides along the rail 110 from the starting position (i.e., the position illustrated in FIGS. 1A and 1B) to the end position shown here. The projectile 105 may slide along the rail 110 until reaching the locking element 120 (not shown) which holds the projectile 105 at the end position. Moreover, the apparatus 100 includes a second locking element 140 which can be used to hold the projectile 105 at the starting position. For example, the throwing apparatus 100 may include a button which the user presses in order to release the locking element 140 to permit the projectile 105 to move from the starting position to the end position as shown by arrow 145. Similarly, the same button may be pressed to release the locking mechanism 120 shown in FIG. 1A to permit the projectile 105 to return to the starting position.

Although not necessary, the locking elements 120 and 140 prevent the projectile 105 from sliding on the rail in response to other actions besides throwing actions. For example, the user may perform other actions while wearing the throwing apparatus 100 besides a throwing action such as jumping, raising his arm, spinning, etc. These actions may apply a force to the projectile 105 that would otherwise cause the projectile 105 to slide along the rail 110 but for the locking elements 120, 140 which hold the projectile 105 stationary. The locking elements 120, 140 prevent other user actions from being misinterpreted as a throwing action by the throwing apparatus 110. Once the user wants to perform a throwing action, she can press a button or a switch which releases locking element 140 and permits the projectile 105 to move along the rail 110. Similarly, before the projectile 105 can be thrown again, the user may activate a button which releases locking element 120 so that the projectile 105 can return to the starting position.

Figure 4:
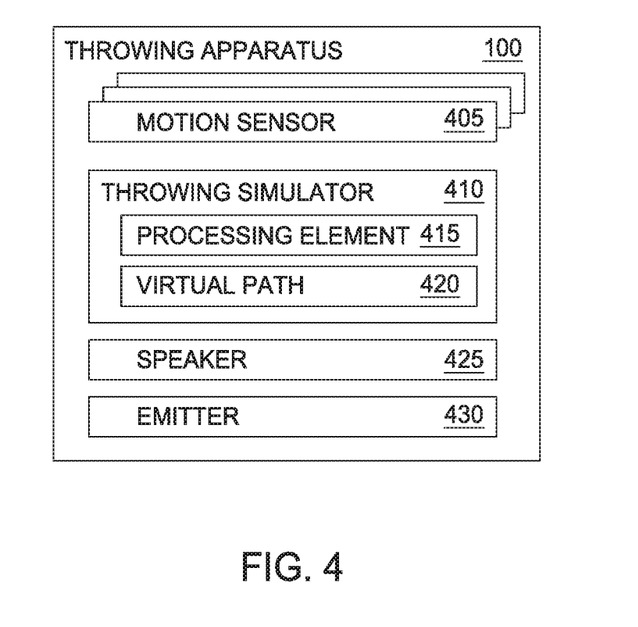
FIG. 4 is a block diagram of the throwing apparatus, according to one embodiment described herein.

FIG. 4 is a block diagram of the throwing apparatus 100, according to one embodiment described herein. The throwing apparatus 100 includes one or more motion sensors 405, a throwing simulator 410, a speaker 425, and emitter 430. The motion sensors 405 may include any sensor for measuring motion or orientation of the throwing apparatus 100 or the projectile—e.g., accelerometer, gyroscope, and the like. For example, when performing a throwing action, the motion sensors 405 may determine the orientation of the apparatus 100 when the projectile reaches the end position of the rail (or any other predefined position) as well as the acceleration of the projectile as it slides along the rail. The motion sensors 405 may be disposed on the support element or the projectile in order to measure the orientation of the throwing apparatus 100 and the forces corresponding to the throwing action.

The throwing simulator 410 includes a processing element 415 and a virtual path 420. The processing element 415 may be a general purpose computer processor or an application specific integrated circuit (ASIC). Although illustrated as hardware, the functions performed by the processing element 415 may be implemented using firmware or a software application. In one embodiment, the processing element 415 processes the data captured by the sensor 405 to identify the virtual path 420 of a virtual object launched by the throwing action projectile. Although the projectile does not leave the throwing apparatus 100, the throwing simulator 410 identifies the path 420 the projectile would have followed and launches the virtual object representing the projectile on this path 420.

In one embodiment, the speaker 425 outputs audio indicated a position of the virtual object on the virtual path 420. For example, using a velocity of the projectile as it slides along the rail, the speaker 425 generates a sound simulating the current location of the virtual object on the virtual path 420. For example, if the projectile is a shield, the speaker 425 outputs audio of the shield flying through the environment (e.g., a whooshing or whizzing sound). By changing the volume of the audio, the throwing simulator 410 can simulate a distance from the virtual object (i.e., the virtual shield) to the throwing apparatus 100 as the virtual object traverses the virtual path 420. For example, when the virtual object is first launched (e.g., when the projectile reaches the end position on the rail), the speaker 425 outputs the loudest sound. To simulate the virtual object traversing the virtual path 420 in a direction away from the throwing apparatus 100, the speaker 425 gradually reduces the volume of the audio over time.

In one embodiment, the throwing apparatus 100 uses the emitter 430 to indicate to an external device (e.g., a storytelling device) the virtual path 420. For example, in response to launching a virtual object along the path 420, the emitter 430 may transmit a line-of-sight signal (e.g., an infrared or visible light signal) in a direction of the virtual path 420. In one embodiment, the emitter 430 may be disposed on a front facing surface of the throwing apparatus so that the line-of-sight (LOS) signal has a beam pattern extending in the same direction as the virtual path 420. Any external devices receiving the LOS signal know they are along the virtual path 420 and should respond accordingly. For example, an action figure mounted on the device may perform a motion or emit a sound that simulates being struck by the projectile.

In one embodiment, the emitter 430 may transmit data in a radio frequency (RF) signal indicating the virtual path 420 traveled by the projectile. The data may include different geographic points or coordinates corresponding to the virtual path 420. Using this information, an external device can determine whether it lies along the virtual path 420, and thus, if it is struck by the virtual object.

Figure 5:
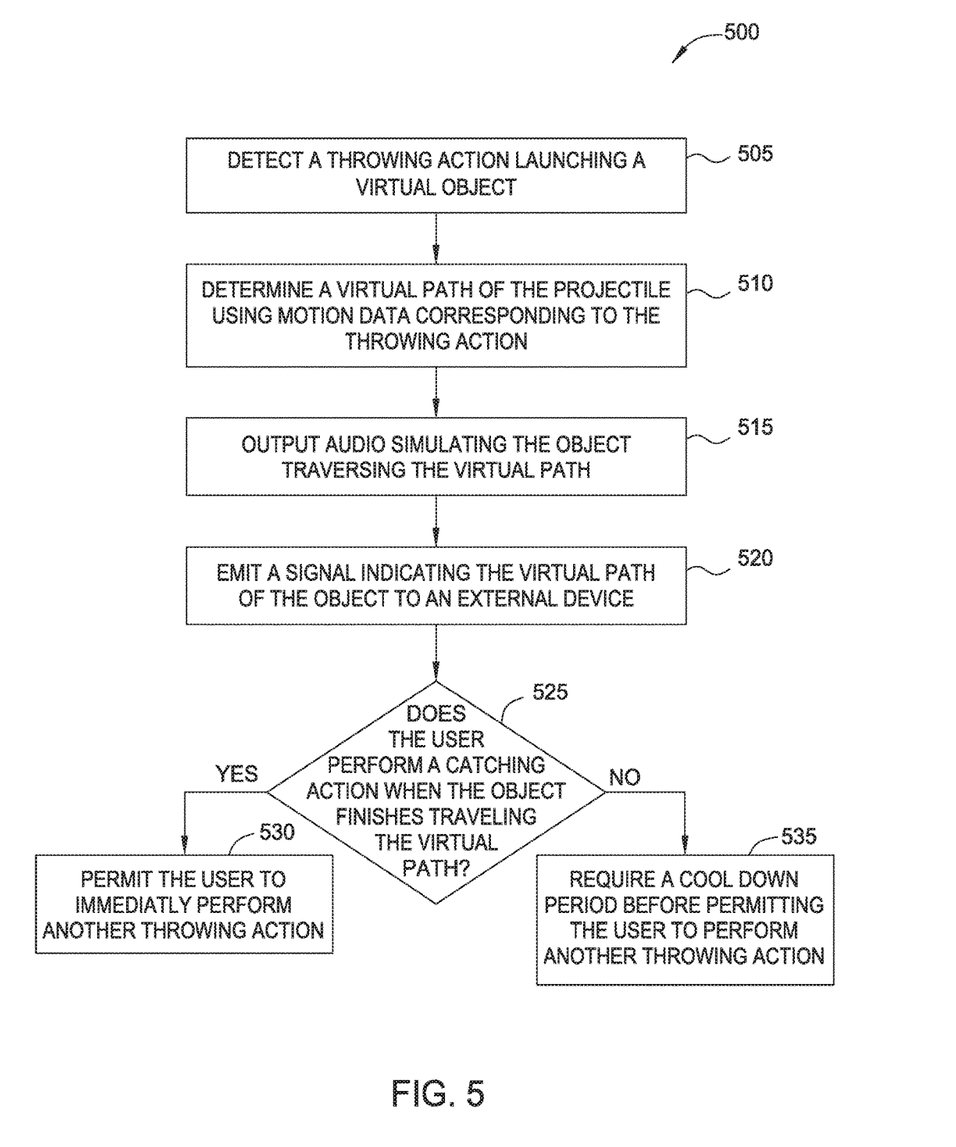
FIG. 5 is a flowchart for launching a virtual object corresponding to a throwing action, according to one embodiment described herein.

FIG. 5 is a flowchart of a method 500 for launching a virtual object corresponding to a throwing action, according to one embodiment described herein. At block 505, the throwing apparatus detects a throwing action launching a virtual object. As mentioned above, a user may move the throwing apparatus in a throwing motion which moves the projectile along the rail. The throwing apparatus includes motion sensors that detect the forces corresponding to this motion. In one embodiment, the throwing simulator on the apparatus processes the data captured by the sensors to determine if the user performed the throwing motion. For example, the throwing simulator may have a minimum velocity threshold required before a user action is classified as a throwing action. If the velocity of the projectile as it slides along the rail does not satisfy this threshold, the throwing simulator may ignore the motion or provide audio feedback instructing the user to try again.

In another embodiment, the throwing apparatus may detect the throwing action by the projectile sliding down the rail and being locked into place by a locking element (e.g., locking element 120 shown in FIG. 1B) at the end position of the rail. Stated differently, because the user has moved the projectile from the starting position to the end position, the throwing simulator determines that the user intended to perform a throwing action.

In response to detecting the throwing action, the throwing simulator launches a virtual object representing the projectile. The physical projectile remains disposed on the throwing apparatus but the virtual object is launched in a similar direction as the movement of the physical projectile on the rail. As described below, the throwing apparatus can simulate the effects of launching the physical projectile into free space using the virtual object without any of the safety issues related to throwing physical objects.

At block 510, the throwing simulator determines a virtual path of the projectile using motion data corresponding to the throwing action. Stated differently, the throwing simulator identifies the path the virtual object follows after being launched from the throwing apparatus. In one embodiment, the throwing simulator uses one or more gyroscopes to determine the orientation of the throwing apparatus. Because the direction the virtual object is launched corresponds to the direction in which the rail extends, once the orientation of the apparatus is found, the throwing simulator can calculate the virtual path which extends in the same direction as the rail. Put differently, in this example, the virtual path extends in the same direction defined by the longitudinal axis of the rail.

In one embodiment, the throwing simulator calculates the velocity of the projectile, and thus, the velocity of the virtual object as it travels along the virtual path. For example, an accelerometer may be mounted on the projectile or the throwing apparatus to measure the forces applied by the throwing motion. From this measurement, the throwing simulator can identify the velocity at which the virtual object moves away from the throwing apparatus. Because calculating the speed of the virtual object is not dependent on identifying a virtual path, the throwing simulator does not need to identify a specific virtual path in free space in order to determine the speed at which the virtual object moves away from the throwing apparatus.

At block 515, a speaker on the throwing apparatus outputs audio that simulates the virtual object traversing the virtual path away from the apparatus. The audio may correspond to a sound the physical projectile would make if thrown, for example, a whooshing or buzzing sound. In one embodiment, as the virtual object moves away from the throwing apparatus along the virtual path, the throwing simulator instructs the speaker to decrease the volume of the audio thereby mimicking the sound effect of a real-world object moving away from the throwing apparatus. In one embodiment, the throwing simulator uses the velocity of the virtual object measured at block 510 to determine how rapidly to change the volume of the audio. For example, the faster the velocity, the faster the audio is decreased. In this manner, the throwing simulator can indicate to the user the speed at which the virtual object is travelling.

In one embodiment, the throwing simulator does not need to calculate the virtual path in order to simulate the virtual object traveling away from the throwing apparatus. In response to a throwing action, the simulator may instruct the speaker to begin outputting audio corresponding to the virtual object being launched. That is, the throwing apparatus does not need to know the direction the object is launched or the orientation of the apparatus when the virtual object is launched in order to control the audio to simulate the virtual object traveling away from the user. Moreover, the throwing simulator does not need to calculate the velocity of the virtual object and instead can use a predefined sound recording simulating the projectile flying away from throwing apparatus.

At block 520, the throwing apparatus emits a signal indicating the virtual path of the object to an external device (e.g., a storytelling device). In one embodiment, the emitter is a LOS emitter (e.g., an infrared emitter, visible light emitter, or ultraviolet emitter) which has a defined radiation pattern. An example of using a radiation pattern to indicate the virtual path of a virtual object is shown in FIG. 6.

Figure 6:
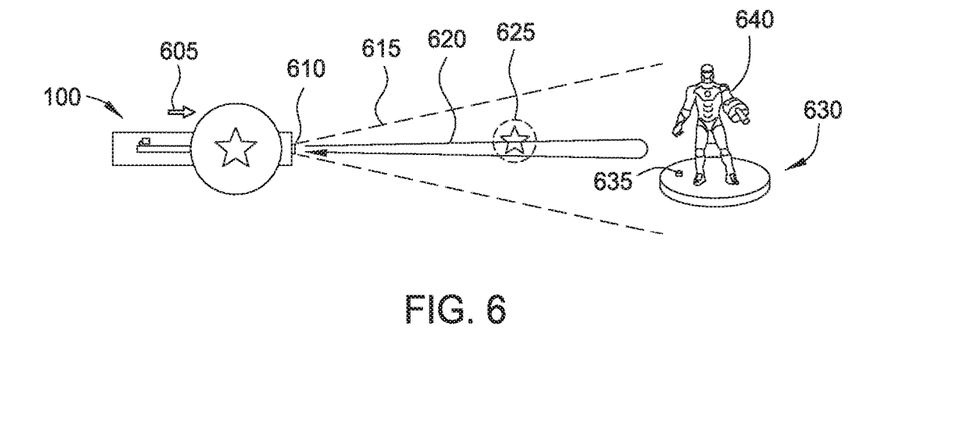
FIG. 6 illustrates interacting with an external device using the virtual object, according to one embodiment described herein.

FIG. 6 illustrates an emitter 610 providing an indication of the virtual path 620 to a storytelling device 630 (i.e., an external device) in an immersive storytelling environment 600. As shown by arrow 605, the projectile 105 on the throwing apparatus 100 has moved from the starting position to the end position. In response, the throwing apparatus 100 launches a virtual object 625 along a virtual path 620.

The throwing apparatus 100 activates an emitter 610—e.g., a LOS emitter—which transmits a signal with a radiation pattern 615 which may have a conical shape. Any receivers inside of the radiation pattern 615 can detect the signal while receivers outside the pattern 615 cannot. As shown, the storytelling device 630 includes a receiver 635 within the radiation pattern 615 which detects and reads the signal transmitted by the emitter 610. The signal may include modulated data that informs the device 630 that the throwing apparatus 100 launched a virtual object 625 representing a thrown projectile.

Because the storytelling device 630 received the signal (i.e., is within the radiation pattern 615), the device 630 knows it is along the virtual path 620, and thus, is struck by the virtual object 625. In response, the storytelling device 630 may cause an action FIG. 640 thereon to perform an action as if the FIG. 640 was physically struck by the projectile. For example, the action FIG. 640 may fall over, vibrate, bend over, and the like. In this manner, the storytelling system 600 can simulate the action FIG. 640 being struck by the physical projectile without having to actually launch the projectile. If multiple storytelling devices 630 receive the signal (i.e., are within the radiation pattern 615), in one embodiment, all the storytelling devices 630 cause their corresponding action FIG. 640 to simulate being struck by the projectile. Alternatively, the apparatus 100 may select one of the storytelling device 630. To do so, each storytelling device 630 transmits a reply message to the apparatus 100 once the signal transmitted by the emitter 510 is received. If multiple reply messages are received, the apparatus 100 selects the storytelling device 630 that replied first, which may be the device 630 that is closest to the apparatus 100. The apparatus 100 may then transmit a second message using the emitter 610 with an ID of the selected storytelling device 630 thereby informing the multiple storytelling devices 630 within the radiation pattern 615 which one should simulate being hit by the projectile.

In one embodiment, the device 630 may know the distance between itself and the throwing apparatus 100, and thus, based on the velocity of the virtual object 625 determines when the virtual object 625 strikes the action FIG. 640. For example, IR range detection or Received Signal Strength Indicator (RSSI) may be used to calculate a distance between the apparatus 100 and the storytelling devices 630. However, in other embodiments, the distance between the throwing apparatus 100 and device 630 may be unknown. The storytelling device 635 may wait a predefined time (e.g., a predefined delay derived from an average assumed or estimated distance) after receiving the signal from the emitter 610 before causing the action FIG. 640 to fall down. To increase realism, the emitter 610 may inform the storytelling device 630 of the velocity at which the virtual object 625 was launched. Although in this example the device 630 does not know the separation distance and thus cannot calculate the precise time the object 625 reaches the action FIG. 640, the storytelling device 630 can adjust the predefined time in response to the velocity. For example, as the velocity increases, the storytelling device 630 reduces the predefined time it waits before simulating the effects of the projectile striking the action FIG. 640. Conversely, as the velocity decreases, the device 630 may increase the predefined time before the action FIG. 640 reacts to the virtual object 625.

In one embodiment, instead of the storytelling device 630 determining how long to wait before the action FIG. 640 reacts to the launched virtual object 625, this calculation may be performed by the throwing simulator in the throwing apparatus 100. The throwing simulator may calculate the time delay using the velocity and then wait to transmit a signal on the emitter 610 until the delay has expired. Once the storytelling device 630 receives the signal, the device 630 can immediately instruct the action FIG. 640 to simulate getting struck by the projectile. Doing so may reduce the amount of circuitry and logic on the storytelling device 630 which can reduce its cost.

In one embodiment, the device 630 includes actuators which are used to move some or all of the action FIG. 640. The actuators may include a vibration system, motors, gears, and the like. For example, if the projectile is a shield, the signal transmitted by the emitter instructs the device 630 to control the actuators so that the action FIG. 640 moves in a manner like the figure was physically hit by the shield. Advantageously, using the LOS signals to transmit instructions from the throwing apparatus 100 to the target storytelling device 630 permits the device 630 to respond to the user action without the projectile (or user) having to actually strike the action FIG. 640.

In one embodiment, the storytelling device 630 also includes an output device which may output sound or videos. For example, the actuators and the output device may be used in tandem to simulate the effect of the shield striking the action FIG. 640. For instance, while the actuators move the action FIG. 640, the output device may generate a grunting noise.

In one embodiment, the radiation pattern 615 and the virtual path 620 are treated as being the same. That is, the radiation pattern 615 is the virtual path 620 traversed by the virtual object 625. Any storytelling device 630 within the radiation pattern 615 is deemed to be on the virtual path 620, and thus, is struck by the virtual object 625. In one embodiment, the radiation pattern 615 may be shaped using lens or reflectors so that the pattern 615 more closely aligns to an expected path that a launched projectile would follow. For example, using a lens can prevent the radiation pattern 615 from being too wide radially so that the transmitted signal is received by storytelling devices that are positioned to the side of the of the throwing apparatus 100 rather than in front of the apparatus 100 as shown in FIG. 6.

In one embodiment, for novice users, the radiation pattern 615 may be expanded radially such that targets that are further away from the longitudinal direction of the rail on the apparatus 100 are within the radiation pattern 615. For example, a storytelling device that is beyond 30 degrees from the center of the radiation pattern 615 may still receive the signal transmitted by the emitter. However, as the user progress and levels up, the apparatus 100 may narrow the radiation pattern 615 so that only storytelling devices directly in front of the apparatus 100 when the user launches the virtual object 625 are within the radiation pattern 615, and thus, are struck by the virtual object 625.

Because LOS signals can reflect off certain surfaces—e.g., mirrors or smooth white walls—the virtual path 620 may bounce off reflective surfaces before reaching the storytelling device 630. Moreover, in one embodiment, the throwing apparatus may require the user to strike the storytelling device 630 using a virtual path 620 that bounces off a reflective surface. For example, using a room mapping technique, the throwing apparatus 100 may be aware of the locations and the reflectivity of the surfaces in the room and the relative location of the storytelling device 630 to these surfaces. In order to unlock a new skill, the throwing apparatus 100 may require the user to perform the throwing action and launch the virtual object 625 at one of the reflective surfaces at an angle that then results in the radiation pattern 615 reflecting off the surface and striking the storytelling device 630. Because the throwing apparatus knows the relative location of the surfaces and the device 630 in the room, the throwing simulator can use geometry to determine if the user successfully launched the virtual object 625 along a virtual path 620 that strikes the storytelling device 630 after being reflected off a surface.

In one embodiment, the shape of the radiation pattern 615 of the emitter 610 does not determine whether the storytelling device 630 is struck by the virtual object 625. For example, the emitter 615 may be an RF emitter that broadcasts signals 360 degrees from the apparatus such that storytelling devices that are not along the virtual path 620 still receive the signal. However, the signal may include location data such as the location of the throwing apparatus 100, the direction of the virtual path 620, geographic points of the virtual path 620, and the like which enable the storytelling device 630 to determine if the device 630 is along the virtual path 620. Thus, in this example, the virtual path 620 is different than the radiation pattern 615 used by the emitter 610 but the emitter 610 transmits location data which enables the storytelling device 630 to determine whether it is on the virtual path 620 and is struck by the virtual object 625.

In one embodiment, the storytelling device 630 may include its own emitter from transmitting a signal back to a receiver disposed on the throwing apparatus 100. For example, once the receiver 635 detects the signal and the device 630 determines it is along the virtual path 620, the storytelling device 630 transmits a reply signal (a LOS or RF signal) to the apparatus 100 indicating that the device 630 was struck by the virtual object 625. In one embodiment, the storytelling device 630 may send the reply signal once it instructs the action FIG. 640 to simulate being struck by the projectile. Put differently, the reply signal informs the throwing apparatus 100 that the virtual object 625 has hit the target. As such, the throwing apparatus 100 can then use its output device to supplement any output devices on the device 630. For example, the speaker on the throwing apparatus 100 may output a clanging noise at the same time the action FIG. 640 is falling down. Moreover, as shown in FIG. 6, after hitting the storytelling device 630, the virtual path 620 returns to the throwing apparatus 100—i.e., a boomerang effect. The throwing apparatus 100 can use the reply signal to determine when the speaker on the throwing apparatus 100 should begin to increase the audio corresponding to the flying projectile to simulate the virtual object 625 returning to the throwing apparatus. However, this is not necessary. In other embodiments, the virtual path 620 may be only one way as in the case of shooting an arrow or throwing a javelin. In this example, the apparatus 100 may stop outputting sound corresponding to the flying projectile once the device 630 confirms it was hit by the virtual object 625.

Returning to method 500, at block 525, the throwing simulator determines whether the user performs a catching action when the virtual object finishes traversing the virtual path and returns to the throwing apparatus. Of course, if the action path does not return to the throwing apparatus, then this portion of method 500 could be skipped.

In one embodiment, to successfully perform the catching action, a user may need to return the projectile from the end position to the starting position synchronous with the audio outputted from the speaker. For example, once the audio increases to the original volume used when launching the virtual object, the user must perform the catching action such as pressing a button to release the locking element holding the projectile at the end position and raising her arm so that gravity pulls the projectile from the end position to the starting position. In another example, performing the throwing action may compress a spring that is then released during the catching action to force the projectile back to the starting position. In any case, the user may have to perform the catching action within a certain time window in order to simulate successfully catching the returning virtual object.

If the catching action was successful, at block 530, the throwing apparatus permits the user to immediately perform another throwing action. For example, method 500 may return to block 505 once another throwing action is detected. However, if the user did not perform the catch within the time window, method 500 instead proceeds to block 535 where the throwing apparatus requires a cool down period before permitting the user to perform another throwing action. For example, the throwing apparatus 100 may prevent the user from unlocking either of the locking elements 120 or 140 shown in FIGS. 1A and 3 thereby preventing the user from moving the projectile along the rail. Alternatively, the user may be able to move the projectile, but the throwing simulator does not respond to a throwing action until the cool down period has expired. Once the cool down period expires, the method 500 may return to block 505 to detect another throwing action.

Figure 7:
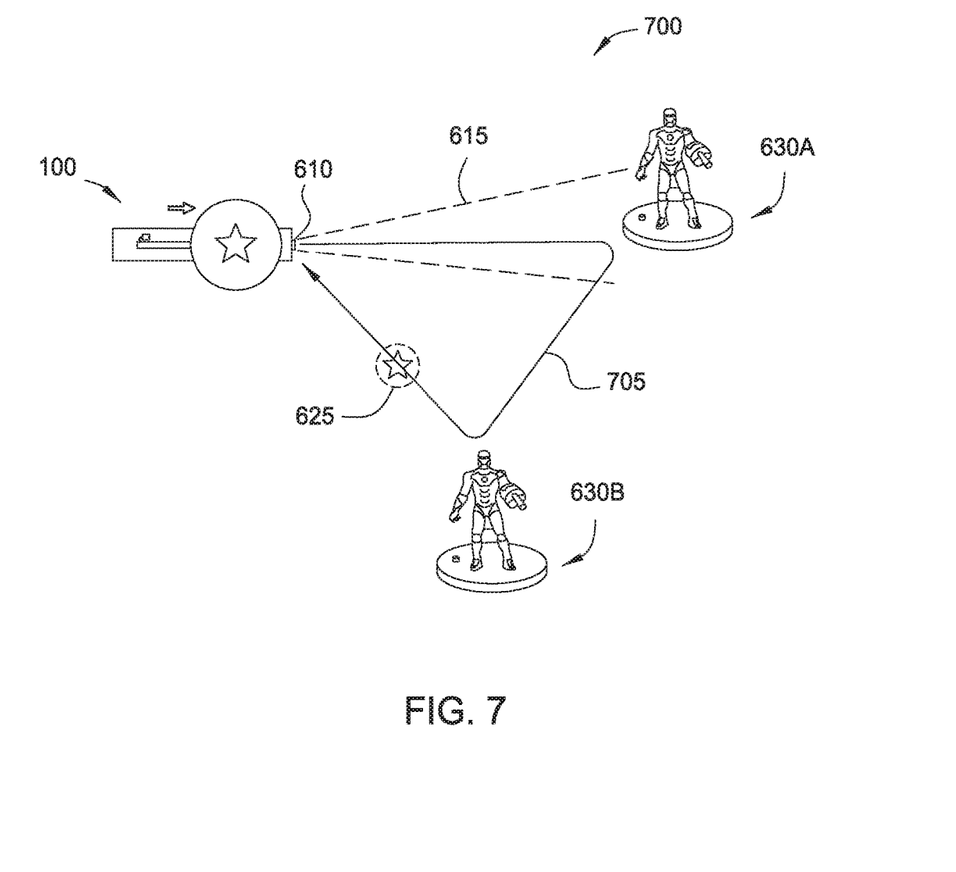
FIG. 7 illustrates interacting with multiple external devices using the virtual object, according to one embodiment described herein.

FIG. 7 illustrates interacting with multiple external devices using the virtual object, according to one embodiment described herein. In storytelling system 700, the virtual object 625 strikes multiple storytelling device 630. That is, two of the storytelling devices 630 lie along the same virtual path 705. As shown, the virtual path 705 first extends from the throwing apparatus 100 to the first storytelling device 630A. For example, because the storytelling device 630 is within the radiation pattern 615, the storytelling device 630A determines it was targeted by the user and is along the virtual path 705.

Instead of the path 705 stopping or returning to the throwing apparatus 100, the virtual path 705 extends from the first device 630A to a second storytelling device 630B. Put differently, the virtual object 625 ricochets off the first device 630A and strikes the second device 630B. In one embodiment, whether or not the virtual object ricochets towards a second target is determined by the skill level of the user. For example, a novice user may be unable to cause the virtual object 625 to strike multiple targets. However, as the user advances (e.g., improves her throwing action, unlocks skills, or accomplishes specific tasks or goals) the ability to strike several targets using one throwing action is permitted. Moreover, as the user level increases, the throwing apparatus may increase the odds that striking the first device 630A results in a ricochet striking the second target 630B instead of the virtual path 705 stopping at the first target 630A or returning to the throwing apparatus 100.

To perform the ricochet, the throwing apparatus 100 may first ensure the virtual object 625 strikes at least one target. For example, the first storytelling device 630A may transmit a reply signal to the apparatus 100 indicating the device 630 received the signal transmitted by the emitter 610. Once this signal is received, the throwing apparatus 100 may broadcast a second signal using a different emitter—e.g., an RF emitter which broadcasts using a wide radiation pattern—to identify a second storytelling device 630B which is outside the radiation pattern 615 of the emitter 610. The throwing apparatus 100 may receive replies from multiple different device 630 and select one of the devices 630—i.e., target device 630B—as the next target. The throwing apparatus 100 may select the target device depending on signal strength of the reply signals, a priority corresponding to the devices, or if a relationship exists between the device 630A already struck by the virtual object 625 and one of the devices responding to the second signal. In one embodiment, storytelling device 630A does not transmit a reply to the second signal since it was already struck by the virtual object 625.

Once the next target is selected, the throwing apparatus 100 may transmit a third signal to the selected target—i.e., storytelling device 630B—indicating it was selected as the next target of the virtual object 625. After a delay simulating the time required by the virtual object 625 to travel from the first device 630A to the second device 630B, the storytelling device 630B moves its action figure to simulate being struck by the projectile. Moreover, the speaker of the throwing apparatus 100 may maintain the sound of the projectile at a constant volume to indicate the projectile is ricocheting to another target rather than returning to the apparatus 100. However, if the locations of the storytelling devices 630 relative to the throwing apparatus 100 are known, then the speaker can change the volume depending on the portion of the virtual path 705 between the storytelling device 630A and 630B. As shown in FIG. 7, this portion of the virtual path 705 is essentially the same distance from the throwing apparatus 100, and thus, the speaker may output a constant volume. However, if the first device 630A was on one side of the apparatus 100 but the second device 630B was on the other, the speaker may increase and then decrease the volume of the audio output as the virtual object 625 flies past the throwing apparatus 100 in order to strike the second storytelling device 630B after ricocheting off device 630A. Moreover, the throwing apparatus 100 may continue to extend the virtual path 705 to other storytelling devices 630 by repeating the process described above—i.e., the virtual object 625 can strike three or four targets during one throw.

In another embodiment, the apparatus 100 may perform ricochets by broadcasting an RF message to multiple storytelling devices 630 at once. The message could include an ID of the storytelling devices 630 and when that storytelling device 630 should simulate being struck by the projectile. For example, the broadcasted message could indicate that storytelling device 630A is struck in two seconds, while storytelling device 630B is struck in four seconds. The storytelling devices 630 would wait the indicated delay before simulating their respective action figure being struck by the projectile.

In another embodiment, instead of the throwing apparatus 100 determining the next target for the virtual object 625, the storytelling device 630A may identify the next target. For example, the storytelling device 630A may use a RF emitter to select a neighboring storytelling device as the next target. The device 630A may transmit a RF signal and select one of the storytelling devices that send a reply based on signal strength indicating which one of the storying telling devices is closest to the device 630A. Permitting the storytelling device 630A to select the next target may be desired since this device 630A can more easily determine its closest neighboring device—e.g., device 630B—which is the most realistic target following a ricochet. Once the next target is selected, the device 630A may inform the apparatus 100 so it can output the appropriate audio output to the user.

Figure 8:
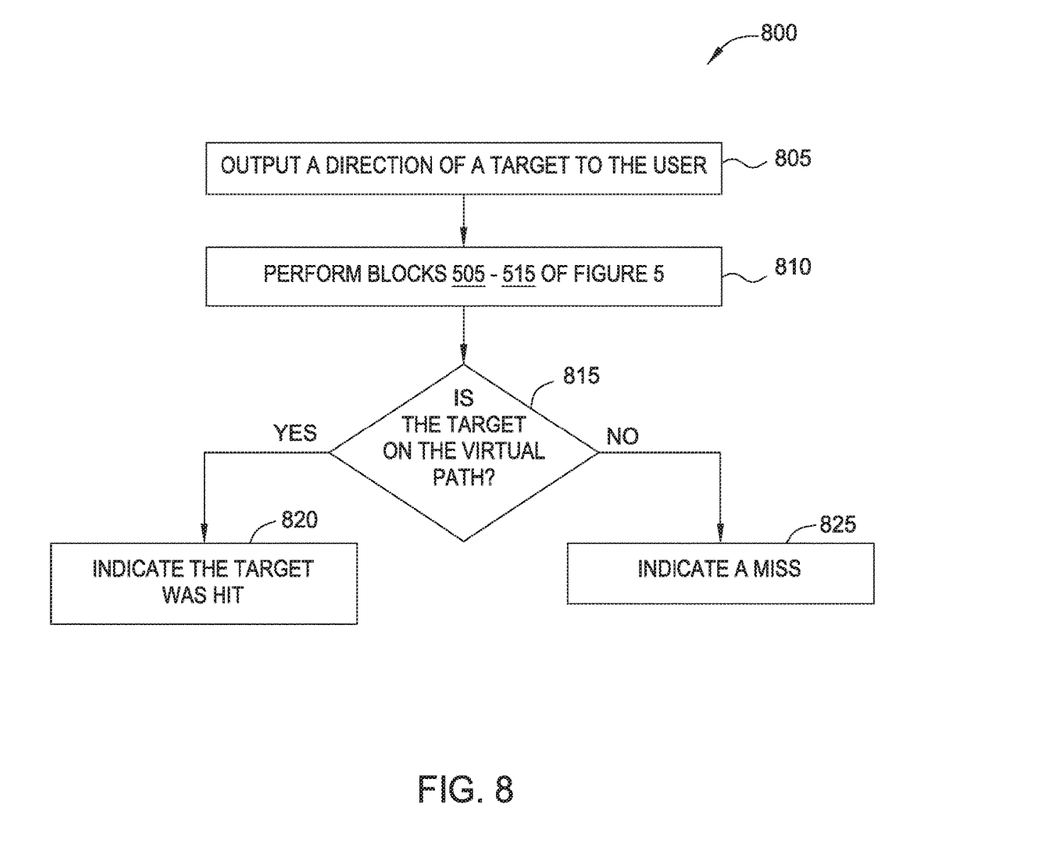
FIG. 8 is a flowchart for interacting with a virtual target using the virtual object, according to one embodiment described herein.

FIG. 8 is a flowchart of a method 800 for interacting with a virtual target using the virtual object, according to one embodiment described herein. At block 805, the throwing apparatus outputs a direction of a virtual target to the user. For example, the speaker may state, "What out, there is an enemy at your two o'clock," or "There is an enemy to your left!" Alternatively, a display on the throwing apparatus (e.g., or other output device) illustrates the location of the virtual target relative to the user. Using a current orientation of the throwing apparatus, the throwing simulator determines whether the user performs a throwing action resulting in launching a virtual object in the direction of the virtual target. To do so, at block 810, the throwing apparatus performs block 505-515 of method 500.

At block 815, the throwing simulates determines whether the direction of the virtual path resulting from the throwing action is in the direction of the virtual target. If so, at block 820, the speaker indicates that the virtual target was hit, but if not, at block 825, the speaker indicates the target was missed. In one embodiment, the throwing simulator may wait to perform either block 820 or block 825 until the virtual object has already traversed the virtual path. For example, the throwing simulator may wait until a predefined delay (e.g., a few seconds) before indicating to the user whether the target was hit or not. If there was a hit, the speaker may output a sound indicating that the target was hit such as a grunt or a clang. Moreover, the speaker may begin to increase the audio output of the flying projectile to simulate the projectile returning to the throwing apparatus. As mentioned above, the user may have to successfully perform a catching action in order to again use the projectile to attack another virtual target when method 800 repeats.

If the virtual path does not correspond to the location of the virtual target, the speaker may not output audio of the projectile returning to the throwing apparatus. Instead, a cool down period may be required which simulates the time a user would need to go and retrieve the projectile before another throw can be attempted. Put differently, the virtual object may exhibit the boomerang effect only if the user successfully hit the virtual target. In this manner FIG. 8 illustrates a method for using the throwing apparatus to hit virtual targets rather than real targets (e.g., storytelling devices 630) shown in FIGS. 6 and 7.

In one embodiment, the throwing apparatus may use a random number generator to determine if the virtual target is hit. The odds that the target is hit may vary depending on the skill level of the user in the game or the level of the enemy represented by the virtual target. For example, a super villain may be more difficult to hit than a henchman. Thus, even if the virtual target is along the virtual path, it is possible the user may still miss the target. Moreover, the random number generator may be used to determine hits if the virtual path is not known. For example, if directional information is not available, the throwing apparatus can use the skill level of the user to determine if the virtual target is struck.

Moreover, the throwing apparatus may detect other user actions besides throwing actions. For example, the user may perform a thrusting action by quickly accelerating the throwing apparatus in a direction away from the user as if to strike an enemy. However, the projectile may remain stationary during the thrusting action, thereby distinguishing the thrusting action from the throwing action. The thrusting action may be used to simulate a melee attack on a target while the throwing action simulates a ranged attack. In another example, the throwing apparatus may detect a swinging action where the user swings the throwing apparatus along a curved path while the projectile remains stationary on the rail. Like the thrusting action, the swinging action may simulate a melee attack on a target. In both of these actions, the throwing apparatus may use an emitter to inform a storytelling device within range of the emitter of the attack. In response, the storytelling device may cause a corresponding action figure to simulate being hit by the attack using one or more actuators. In this manner, the throwing apparatus can detect multiple different user actions which can affect the storytelling devices in different ways. For example, the action figure may react differently when hit by a melee attack rather than a ranged attack. In another example, the actions may be used to simulate attacks against virtual targets rather than physical targets such as the storytelling devices.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
    detecting a throwing action causing a physical projectile to move along a rail on an apparatus;
    in response to determining the physical projectile reaches a predefined position on the rail, indicating a virtual path in free space of a virtual object launched by the throwing action, wherein the virtual object represents the physical projectile;
    after detecting the throwing action, detecting a catching action causing the physical projectile to move on the rail; and
    determining whether the catching action is performed within a predefined time window corresponding to when the virtual object has completed the virtual path and returned to the apparatus.

2. The method of claim 1, wherein detecting the throwing action comprises:
    determining that the physical projectile reached an end position on the rail, wherein the physical projectile remains on the rail.

3. The method of claim 1, further comprising:
    capturing sensor data corresponding to the throwing action; and
    determining, based on the sensor data, at least one of (i) a velocity at which the virtual object moves on the virtual path and (ii) a direction of the virtual path.

4. The method of claim 1, further comprising:
    upon determining the catching action was not performed within the predefined time window, preventing the virtual object from being again launched by the apparatus for a duration of a cool down period.

5. The method of claim 1, wherein an emitter transmits a line-of-sight (LOS) signal using a radiation pattern, wherein the LOS signal indicates to any target device within the radiation pattern that the target device is on the virtual path of the virtual object.

6. The method of claim 1, further comprising:
    in response to detecting the throwing action, outputting audio on the apparatus simulating the virtual object flying through free space along the virtual path in a direction away from the apparatus.

7. The method of claim 6, wherein the audio comprises a sound made by the physical projectile when flying through free space, wherein the physical projectile does not leave the apparatus.

8. The method of claim 1, further comprising:
    receiving a reply signal from a first external device indicating the virtual object struck the first external device.

9. The method of claim 8, further comprising:
    transmitting a second signal indicating to a second external device that the virtual object ricochets off the first external object and strikes the second external device.

10. An apparatus, comprising:
    a rail,
    a projectile moveably mounted onto the rail;
    an emitter configured to, in response to a throwing action causing the projectile to move along the rail, indicate a virtual path in free space of a virtual object launched by the throwing action, wherein the virtual object represents the projectile; and
    a throwing simulator configured to, after detecting the throwing action:

detect a catching action causing the projectile to move on the rail, and determine whether the catching action is performed within a predefined time window corresponding to when the virtual object has completed the virtual path and returned to the apparatus.

11. The apparatus of claim 10, further comprising:
a speaker configured to, in response to detecting the throwing action, output audio simulating the virtual object flying through free space along the virtual path in a direction away from the apparatus.

12. The apparatus of claim 10, further comprising:
a locking element configured to lock the projectile at an end position on the rail in response to the throwing action, wherein the projectile remains on the rail.

13. The apparatus of claim 10, wherein the emitter transmits a line-of-sight (LOS) signal using a radiation pattern, wherein the LOS signal indicates to any target device within the radiation pattern that the target device is on the virtual path of the virtual object.

14. The apparatus of claim 10, further comprising:
at least one sensor configured to measure data corresponding to the throwing action wherein the throwing simulator is configured to determine, based on the data, at least one of (i) a velocity at which the virtual object moves on the virtual path and (ii) a direction of the virtual path.

15. The apparatus of claim 14, further comprising:
an output device configured to provide a location of a virtual target to a user, wherein, after detecting the throwing action, the throwing simulator is configured to determine based on the data whether the virtual object strikes the virtual target.

16. An apparatus, comprising:
a rail,
a projectile moveably mounted onto the rail; and
a speaker configured to, in response to a throwing action causing the projectile to move along the rail, output audio simulating a virtual object representing the projectile flying through free space in a direction away from the apparatus; and
a throwing simulator configured to, after detecting the throwing action:
detect a catching action causing the projectile to move on the rail, and
determine whether the catching action is performed within a predefined time window corresponding to when the virtual object has completed the virtual path and returned to the apparatus.

17. The apparatus of claim 16, wherein the audio comprises a sound made by the projectile when flying through free space, wherein the projectile does not leave the rail.

18. The apparatus of claim 17, wherein the throwing simulator is configured to reduce a volume of the sound outputted by the speaker over time to simulate the virtual object moving further away from the apparatus.

19. The apparatus of claim 18, wherein the throwing simulator is configured to, after reducing the volume of the sound, instruct the speaker to increase the volume of the sound to simulate the virtual object returning to the apparatus.

* * * * *